United States Patent [19]
Bordeaux

[11] 3,741,009
[45] June 26, 1973

[54] CARBURETOR FLOW STAND

[75] Inventor: Jean Bordeaux, Fullerton, Calif.

[73] Assignee: ACF Industries, New York, N.Y.

[22] Filed: July 1, 1971

[21] Appl. No.: 158,796

[52] U.S. Cl. .......................................... 73/118, 73/3
[51] Int. Cl. .......................................... G01m 19/00
[58] Field of Search ...................... 73/118, 3, 194 R, 73/194 E, 194 EM, 196; 250/43.5 FC, 71 T, 106 T, 218; 356/181, 201, 51, 77

[56] References Cited
UNITED STATES PATENTS

| | | | |
|---|---|---|---|
| 3,528,080 | 9/1970 | Greene et al. | 73/118 |
| 3,524,344 | 8/1970 | Converse et al. | 73/118 |
| 3,517,552 | 6/1970 | Converse et al. | 73/118 |
| 3,469,442 | 9/1969 | Brueckner | 73/118 |
| 3,452,590 | 7/1969 | Wrausmann et al. | 73/118 |
| 3,434,341 | 3/1969 | Zaske | 73/118 |
| 2,826,700 | 3/1958 | Hull | 250/43.5 FC |
| 3,577,158 | 5/1971 | Hahn | 250/43.5 FC |
| 2,936,371 | 5/1960 | White et al. | 250/43.5 FC |
| 3,462,596 | 8/1969 | Saunders | 250/43.5 FC |
| 3,597,616 | 8/1971 | Brunton | 250/83.3 H |

Primary Examiner—Jerry W. Myracle
Attorney—Philip M. Hinderstein

[57] ABSTRACT

In a carburetor flow stand wherein means are provided for establishing a predetermined air flow through a carburetor under test and for generating a signal indicative of the air flow, wherein a fuel line is provided for conducting a fuel to the carburetor, the carburetor operating to mix the fuel with the air, and wherein an output line is connected to the downstream end of the carburetor for receiving the air-fuel mixture therefrom, an improved method and means for determining the fuel flow rate through or the air-fuel mixture ratio produced by the carburetor comprising adding a tracer material to the fuel, the tracer material having a high absorption characteristic at a predetermined location in the electromagnetic spectrum, vaporizing the tracer material, separating the mixture of air and vaporized tracer material from the fuel, and detecting with a spectrum analyzer which is sensitive to said predetermined location in the electromagnetic spectrum the quantity of tracer material in the output line. According to a preferred embodiment of the invention, the tracer material has a high absorption characteristic in the infrared spectrum and the spectrum analyzer is an infrared spectrophotometer.

According to another embodiment of the invention, the fuel itself is entirely vaporized, the fuel being selected to have a high absorption characteristic at a known location in the electromagnetic spectrum, and the spectrum analyzer determines directly the quantity of fuel in the output line.

33 Claims, 3 Drawing Figures

INVENTOR.
JEAN BORDEAUX

BY

ATTORNEY

CARBURETOR FLOW STAND

BACKGROUND OF THE INVENTION

1. Field of the Invention

The present invention relates to carburetor testing apparatus and, more particularly, to an improved method and means for flow testing carburetors to quantitatively determine the air-fuel ratio produced thereby.

2. Description of the Prior Art

Virtually all motor vehicles operating in the world today use gasoline engines and the operation of such engines is essentially always controlled by a carburetor. While there are many different types of carburetors, they all operate to regulate and control the amount of air and fuel admitted to the engine. Because of the many, varied operating conditions that a gasoline engine is subjected to, such carburetors are complicated devices consisting of many component parts. Suffice it to say that such component parts are intended to cooperate in such a manner as to properly control the air-fuel mixture ratio regardless of the operating conditions, from curb idle to wide open throttle.

Because of the extent of the problem, it is only necessary to briefly mention that the widespread use of gasoline engine-powered motor vehicles has created a serious, world-wide, air pollution problem. While the automobile engine is not the only contributor to such problem, it has, for many years, played a significant role.

Tests show that the degree of air pollution caused by an automobile engine depends, in large measure, on the efficiency with which the engine burns fuel. Complete or near complete combustion of fuel, leaving no unburned hydrocarbons or carbon monoxide fumes, can result in an insignificant amount of pollution from an automobile engine. On the other hand, incomplete or improper combustion in a gasoline engine creates substantial amounts of air pollution.

In the past, the main concern of those charged with the responsibility of designing and building production carburetors was the production of power for acceleration and high speeds. Little concern was given to the efficiency of combustion and engine emissions. As a result, the ability of the carburetor to regulate and control the air-fuel mixture to tolerances which would result in complete or hear complete combustion of the fuel was non-existent and the performance characteristics from one carburetor to another varied widely.

With the rising public concern regarding air pollution, certain laws and regulations have been passed to control the operation of gasoline engines and their carburetors. Such laws and regulations, by specifying allowable levels of engine emissions, indirectly determine the tolerances in carburetor performance throughout its operating range. More specifically, for any given carburetor, an ideal curve of air-fuel ratio versus air flow may be plotted for the entire range of the carburetor. Such curve starts at a point known as "curb idle" with the throttle blade in its fully closed position. Typically, this is the point of minimum air-fuel ratio. As the throttle is engaged and the engine starts to accelerate, the air-fuel ratio generally increases sharply until the "off idle" point is reached where the throttle blade has moved far enough to start to uncover an additional port in the carburetor throat. At this point, the air-fuel ratio levels off and remains relatively constant as air flow increases. As the throttle blade continues to be rotated during acceleration, the "part throttle" point is reached where the throttle blade has moved far enough to start to uncover still another port in the carburetor throat. Finally, if the throttle blade is rotated still further to its most extreme position, the "wide open throttle" position is reached.

If an actual production carburetor were to exactly follow such ideal curve of air-fuel ratio versus air flow over the entire operating range of the carburetor, and assuming other parts of the engine were adjusted properly, there would be essentially complete or near complete combustion and very little pollution. However, such an ideal condition is never reached and it is one of the objectives of the existing laws and regulations to control the extent of deviations from such ideal operation conditions.

In order to comply with the emission requirements of these laws and regulations, it is an industry-wide practice, in the manufacture of carburetors, to place each so manufactured carburetor on a flow stand to quantitatively determine the amount of air and fuel being handled by the carburetor, for one or more of the beforementioned settings of the throttle valve, in order to determine whether it falls within prescribed tolerances. Although there are many different types of flow stands for testing production line carburetors, all have certain characteristics in common. Heretofore, the quantity of air has been measured after the air leaves the carburetor and after the fuel has been removed from the air. The air measurement determinations have been achieved by various schemes including orifice meters, venturi meters and sonic nozzles. In combination with any of the aforementioned air measurement schemes, the fuel flow measurement has invariably been made before the fuel enters the carburetor bowl. Heretofore, various kinds of meters have been used, some employing simple U tubes and others employing positive displacement meters.

By way of example, U. S. Pat. No. 2,597,231 issued May 20, 1952 to James L. Edelen for Carburetor Flow Testing Apparatus, discloses a carburetor flow stand in which a downstream measurement of air flow is made using an orifice meter and an upstream fuel flow measurement is made using a variable area fuel flow meter. This is essentially an entirely manual process which is inherently slow and inaccurate. An improvement is disclosed in U. S. Pat. No. 3,452,590 issued July 1, 1969 to Richard C. Wrausmann, et al. for Carburetor Flow Testing Apparatus. Such apparatus is again characterized by a downstream air flow measurement by means of an orifice meter and an upstream fuel flow measurement by means of a positive displacement flow meter. The principle advantage of the Wrausmann, et al system over that disclosed by Edelen is in the automation of the computation of air-fuel ratio.

Still another flow stand is disclosed in U. S. Pat. No. 3,469,442 issued Sept. 30, 1969 to Alexander W. Brueckner for Apparatus for Calibrating Carburetors. As before, the system of Brueckner is characterized by a downstream air flow measurement using sonic nozzles and an upstream fuel flow measurement using a fuel feed and flow measuring device. Finally, a present day carburetor flow stand of considerable complexity and sophistication is described in detail in U. S. Pat. No. 3,517,552 issued June 20, 1970 to Vernon G. Converse III, et al for Apparatus for Testing Carburetors. In spite of the complexity and sophistication of the Converse III, et al apparatus, it is still characterized by a downstream "sonic nozzle" air flow measurement and an upstream "mass flow meter" fuel flow measurement.

Systems of the type described above, such as that in the Converse III, et al patent, are capable of very precise upstream fuel flow measurements and highly accurate air-fuel ratio measurements. However, such systems have two inherent limitations. The first limitation results from the settling time required to achieve a steady state flow after adjustments are made to the carburetor and the second limitation is the inability to measure fuel distribution from the individual barrels of a multi-barrel carburetor. With respect to the second limitation, it will be apparent that since a multi-barrel carburetor has only a single fuel bowl and float mechanism, it is impossible, with an upstream fuel flow measuring system, to determine the fuel flow rate in the individual barrels. While distribution measurements are not manditory at the present time, such a capability would be an advantage now and in the future.

With respect to the first-mentioned limitation, the problem is presently much more serious. More specifically, when a carburetor is initially placed on a flow stand and a fuel flow line is connected thereto for conducting the fuel to the fuel bowl, a first predetermined time period is required for the fuel bowl to fill. In addition, it has been observed that the carburetor does not reach steady state operation immediately after the fuel bowl fills. More specifically, for a second period of time, the float continues to oscillate so that pulses of fuel enter the carburetor bowl rather than a steady stream. With time, these oscillations are damped out and the carburetor reaches a steady state flow condition.

The tolerances initially used for testing carburetors were wide enough so that the oscillations of the flOat did not affect the ability of the flow stand to provide a useful output signal. As a result, a flow stand such as that described by Converse III, et al., was initially capable of testing a relatively large number of carburetors in a given period of time. On the other hand, with increasing demands being made upon the accuracy of fuel metering in production carburetors, to cope with clean air requirements, more and more accuracy in measurement has been required. As a result, the point is presently being reached where the permissible tolerances in carburetor performance are such that oscillations of the float in the carburetor fuel bowl can no longer be ignored. Therefore, it becomes necessary to wait until the oscillations of the float and the resulting variations in upstream flow rate die out before a meaningful flow rate measurement can be achieved. Therefore, systems of the type described by Converse III, et al., which employ upstream fuel flow measurements, are presently capable of testing much fewer carburetors in the same given period of time.

In copending application Ser. No. 158,801, filed concurrently herewith on July 1, 1971 in the name of Edward H. Casey for Carburetor Flow Stand, and assigned to ACF Industries, the assignee of the present application, there is dislcosed a method and means for solving many of these problems in prior art carburetor flow stands. According to the invention described and claimed in such copending application, the air-fuel mixture ratio measurement is achieved by making all measurements below the throttle valve. By making a downstream fuel flow measurement, variations in upstream flow rate caused by oscillations of the float mechanism in the carburetor fuel bowl become completely irrelevant since they do not affect the constant, steady state flow of fuel through the carburetor itself.

According to such copending application, downstream measurements may be made in one of two ways. In one embodiment, a tracer material is added to the fuel and a sensor located immediately below the throttle valve determines the amount of tracer material in the air-fuel mixture, thus indirectly delivering the quantity of fuel present. According to another embodiment of the invention, it is possible to make a single direct measurement of air-fuel ratio by sensing a physical property of the air-fuel mixture such as the density thereof and from this sensing, deliver a signal which is representative of the air-fuel ratio or representative of the quantity of fuel in the mixture.

While such systems are improvements over the prior art and eliminate the problems associated with upstream fluid flow measurements, it has been found that under certain circumstances, other problems exist. For example, where a tracer material is added to the fuel and a sensor located below the throttle valve, the sensor must analyze the entire air-fuel-tracer mixture. The difficulty here is that the mixture, at times, is neither uniform nor homogeneous so that it is difficult to abstract a representative sample. On the other hand, where no tracer is added and a physical property of the air-fuel mixture is sensed, it becomes necessary to vaporize all of the fuel to form a homogeneous air-fuel mixture. However, where this is to be done, the fuel must be carefully selected and it is not possible to use commercially available fuels, as presently used in carburetor flow stands.

SUMMARY OF THE INVENTION

According to the present invention, these and other problems of the prior art are solved by providing a carburetor flow stand which completely eliminates upstream fluid flow measurements. According to the present invention, the fuel flow rate through or the air-fuel mixture ratio produced by a carburetor under test is achieved by making all measurements below the throttle valve. In the first instance, by making a downstream fuel flow measurement, the fuel distribution from the individual barrels of a multi-barrel carburetor may be easily achieved by separately processing the output of the individual barrels. In addition, variations in upstream flow rate caused by oscillations of the float mechanism in the carburetor fuel bowl become completely irrelevant since they do not affect the constant, steady state flow of fuel through the carburetor itself.

Briefly, and in accordance with the preferred embodiment of the present invention, there is contemplated adding to the fuel a predetermined percentage of a tracer material which may be volatilized out of the air-fuel mixture leaving the carburetor. The tracer material is selected so as to have a high absorption characteristic at a predetermined location in the electromagnetic spectrum where the fuel has a relatively low absorption characteristic. After removal of the fuel from the air-tracer mixture, a probe is provided for sampling a portion of the homogenous mixture of air and volatilized tracer material from the output of the carburetor and applying such sample to a spectrum analyzer which is sensitive to the predetermined location in the electromagnetic spectrum. The analyzer detects and measures the quantity of the tracer in the mixture and generates a signal indicative thereof, such signal indicating the fuel flow rate through the carburetor. In order to determine air-fuel mixture ratio, conventional means may be provided for establishing a predetermined air flow through the carburetor and for generating a signal indicative of the air flow, which signal is divided by the fuel flow signal.

It is therefore an object of the present invention to provide an improved carburetor flow stand.

It is a further object of the present invention to provide a novel method and means for determining the fuel flow rate through or the air-fuel mixture ratio produced by a carburetor, under test.

It is a still further object of the present invention to provide a carburetor flow stand capable of more rapid and accurate measurements of fuel flow.

It is another object of the present invention to provide a carburetor flow stand test apparatus and method characterized by a downstream air flow measurement and a downstream fuel flow measurement.

It is still another object of the present invention to provide a carburetor flow stand in which fuel flow is measured indirectly by utilizing a tracer material in the fuel and detecting with an infrared spectrophotometer the quantity of such tracer downstream of the carburetor.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
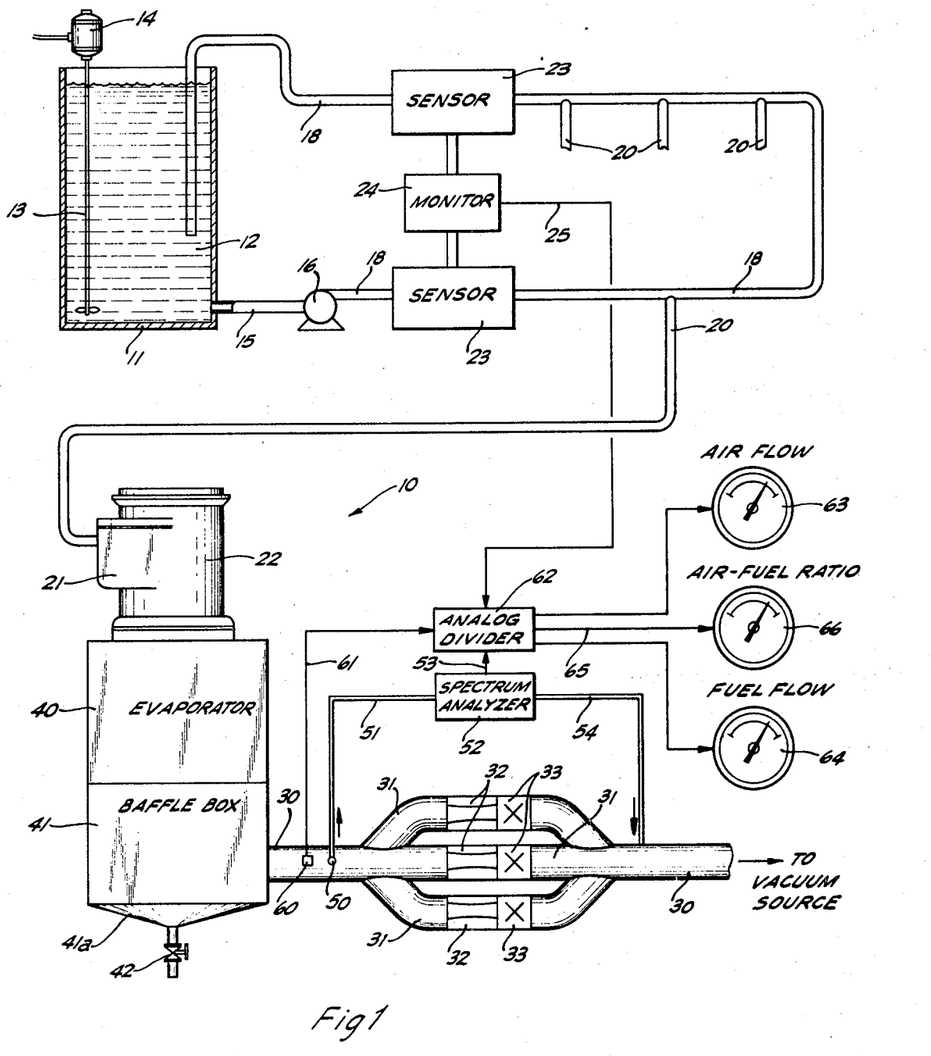
FIG. 1 is a schematic diagram, partly in block diagram form, of the preferred embodiment of a carburetor flow stand constructed in accordance with the teachings of the present invention.

Referring now to the drawings and, more particularly, to FIG. 1 thereof, there is shown a carburetor flow stand, generally designated 10, constructed in accordance with the teachings of the present invention. More specifically, carburetor flow stand 10 includes a fuel tank 11 containing a liquid fuel 12. Fuel tank 11 has positioned therein a stirrer 13 which may be driven by a motor 14 to agitate fuel 12 to insure uniformity thereof. Fuel 12 is withdrawn from tank 11 through a conduit 15 by means of a pump 16 which discharges fuel 12 into one end of a pipe loop 18. The other end of pipe loop 18 extends back into tank 11. Pipe loop 18 has a plurality of drops 20 which deliver fuel 12 to a number of carburetors, one of which is shown at 22. Carburetor 22 is shown in outline form only, but it is to be understood that it contains the usual fuel bowl 21 having a float mechanism therein, together with an automatic choke, idle and high speed fuel systems, as well as a conventional throttle valve.

Fuel 12 in tank 11 can be gasoline such as is used in the automobile on which carburetor 22 will be installed. In practice, however, it has been found that gasoline is an unsatisfactory fuel for this purpose because of its high flammability and inherent safety dangers. As a practical matter, fuel 12 in tank 11 is usually a less volatile material, such as Stoddard's solvent, having a flash point above 100°F thereby reducing the hazards of operation measurably.

According to the preferred embodiment of the present invention, and as will be described more fully hereinafter, fuel 12 includes a predetermined percentage of a tracer material. In order to know the exact percentage of tracer material to fuel, one or more sensors 23 may be included in pipe loop 18. Preferably, a first sensor 23 is positioned adjacent the output of fuel pump 16, at the beginning of pipe loop 18, and a second sensor 23 is positioned after the last drop 20, before pipe loop 18 conducts fuel 12 back into tank 11. As will be discussed more fully hereinafter, sensors 23 are operative to sample a quantity of the fluid passing through pipe loop 18 and to supply such sample to a monitor 24. Also as will be discussed more fully hereinafter, monitor 24 analyzes the samples received from sensors 23 and provides an electrical output on a lead 25 indicative of the percentage of tracer material in fuel 12. The output on lead 25 may be applied to a meter, if desired, or can be used to regulate the input of fuel and/or tracer into tank 11 so that the concentration of tracer material in fuel 12 can be maintained at a predetermined level.

In carburetor flow stands generally, means are provided for establishing an air flow through the carburetor and also for generating a signal indicative of such air flow. In carburetor flow stand 10, a suction pipe 30, which receives the output of carburetor 22, is connected to a suitable source of vacuum, not shown. Suction pipe 30 may be divided into a plurality of branches 31, three such branches being shown in FIG. 1. Each of branches 31 is identical and contains a sonic nozzle 32 in series with a control valve 33. Sonic nozzles are described in greater detail in the aforementioned Converse III, et al. U.S. Pat. No. 3,517,552. The use of a plurality of branch circuits containing sonic nozzles and suitable control valves is discussed more fully in the aforementioned Brueckner U.S. Pat. No. 3,469,442. Sonic nozzles such as those shown at 32 have the property such that only one pressure sensing point is required in order to measure air volume flowing through the nozzle. So long as the pressure drop across the nozzle exceeds a predetermined amount, the upstream pressure is directly related to the air volume flowing through the nozzle. With a plurality of branches 31, each containing one such sonic nozzle 32 and a valve 33, any desired one or combination of sonic nozzles may be energized to produce any desired air flow through suction pipe 30.

The downstream end of carburetor 22 is connected to suction pipe 30 via an evaporator 40 and a baffle box 41. As will be discussed more fully hereinafter, evaporator 40 is provided to insure essentially complete vaporization of the tracer material in fuel 12 to produce a homogeneous mixture of air and tracer material. The output of evaporator 40 is applied to baffle box 41 which is provided to disentrain fuel 12 from the air-tracer material mixture. Baffle box 41 may be similar to that shown in FIG. 3 of the beforementioned copending application of Edward H. Casey and may include a plurality of plates upon which the fuel may collect. Baffle box 41 may also include a sump 41a at the bottom thereof which may be periodically emptied by way of a valve 42.

As will be explained more fully hereinafter, the output of baffle box 41 is a homogeneous mixture of air and the tracer material, with essentially all of the fuel itself removed. Therfore, it will be appreciated by those skilled in the art that evaporator 40 and baffle box 41 are shown diagrammatically simply to indicate the functions that are to be performed. As a practical matter, evaporator 40 and baffle box 41 may be combined in a single, unitary device, or evaporator 40 may be eliminated entirely where complete vaporization takes place in carburetor 22 and/or baffle box 41. A preferred embodiment of evaporator 40 for affecting essentially complete vaporization of the tracer material, while keeping the fuel at a sufficiently low temperature to minimize its vaporization, is shown in FIG. 2.

Figure 2:
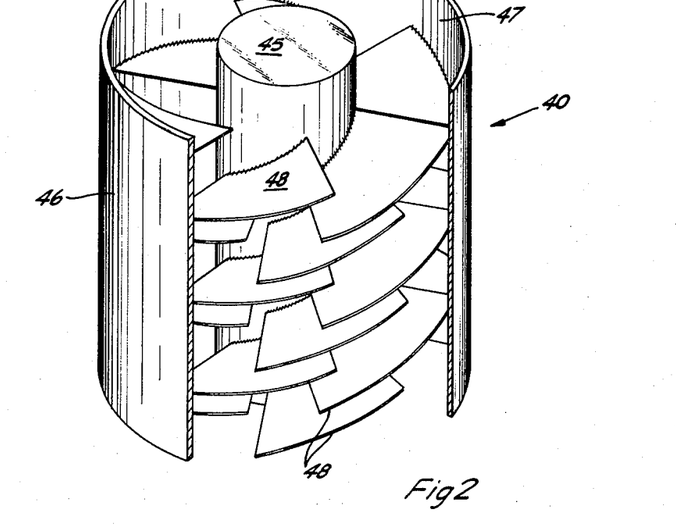
FIG. 2 is an isometric view, partly broken away, of an evaporator suitable for use in the flow stand of FIG. 1.

Referring now to FIG. 2, evaporator 40 may consist of an inner tubular support member 45 and an outer annulus 46 spaced therefrom. Inbetween inner member 45 and outer annulus 46 is an air-fuel-tracer material passageway 47 which includes a plurality of segmented, helical fins 48. Typically, fins 48 would be connected to both inner support member 45 and outer annulus 46. Such a construction provides a long path for the air, fuel and tracer material to assure adequate heating of the fuel for vaporization of the tracer. The segmented helical design prevents fuel droplets and aerosol from flowing directly through evaporator 40 without empacting upon at least one surface. The staggered and segmented helical pattern produces flow stream splitting to provide a high flow velocity across fins 48 and efficient heat transfer.

If it becomes necessary to heat inner member 45 and outer annulus 46 to increase efficiency of vaporization, this may be achieved in many ways. Members 45 and 46 may be provided with heating coils or outer annulus 46 may have a double-wall construction and steam may be circulated therethrough as well as through member 45 which would be made hollow. However, it has been found that under normal circumstances, it is not necessary to apply external heat to evaporator 40.

Returning now to FIG. 1, the output of baffle box 41 is conducted via suction pipe 30 and branch circuits 31 to the vacuum source. As mentioned previously, and as will be discussed in greater detail hereinafter, the output of baffle box 41 contains a homogeneous mixture of air and a tracer material from which essentially all of the fuel has been eliminated. Accordingly, a sample of the homogeneous mixture is extracted from suction pipe 30 via a probe 50 and connected via a conduit 51 to a spectrum analyzer 52. The tracer material is selected so as to have a high absorption characteristic at a predetermined location in the electromagnetic spectrum. Accordingly, analyzer 52 is sensitive to such predetermined location in the electromagnetic spectrum and analyzes the sample in conduit 51 in order to generate an electrical signal on a line 53 indicative of the quantity of tracer material in suction pipe 30, the quantity of tracer material in suction pipe 30 being directly proportional to the fuel flow through carburetor 22. According to the preferred embodiment of the present invention, and as will be discussed more fully hereinafter, the tracer material is selected so as to have a high absorption characteristic at a predetermined location in the infrared spectrum and spectrum analyzer 52 is an infrared spectrophotometer. In any event, after analysis in analyzer 52, the sample is conducted via a conduit 54 back to suction pipe 30 for discharge.

Carburetor flow stand 10 also includes apparatus for generating a signal indicative of the quantity of air flowing through carburetor 22. Such a signal may be generated in any one of many conventional ways. As described more fully in the beforementioned Converse III, et al. U.S. Pat. No. 3,517,552, the air flow generated by a sonic nozzle may be determined by making a single pressure reading at the upstream side of such nozzle. According to the present invention, a pressure transducer 60 is positioned in suction pipe 30, between the output of baffle box 41 and the input to branch circuits 31 and sonic nozzles 32. Pressure transducer 60 is operative to produce an electrical signal on a line 61 indicative of the pressure in suction pipe 30. In the first instance, pressure transducer 60 may operate as in the aforementioned Converse III, et al. patent simply to indicate whether the upstream pressure exceeds a given amount whereby the air flow through sonic nozzles 32 is established. Alternatively, pressure transducer 60 may be an absolute pressure transducer capable of developing a signal directly proportional to air flow. The difficulty with the use of an absolute pressure transducer is that it will also measure the pressure of any water vapor present in suction pipe 30. However, if carburetor flow stand 10 is calibrated with a relatively constant humidity, and the humidity of the testing environment remains relatively constant, as is usually the case, a relatively low error is produced by the water vapor. If it will not be possible to maintain a relatively constant humdity, pressure transducer 60 may be an oxygen sensor providing an electrical signal on line 61 proportional to the partial pressure of oxygen in suction pipe 30.

In any event, the signal on line 61, which is either absolute air pressure or partial pressure of oxygen, and directly proportional to air flow in pipe 30, is conducted to an analog divider 62. After multiplication by suitable conversion constants, such signal may be displayed on a first conventional meter 63 which indicates air flow through carburetor 22.

Analog divider 62 also receives, over line 53, an electrical signal from analyzer 52 indicative of the partial pressure of the tracer material in suction pipe 30, which signal is directly proportional to the quantity of fuel in suction pipe 30 and, therefore, directly proportional to the fuel flow rate through carburetor 22. After multiplication by suitable conversion constants, the signal on line 53 may be displayed on a second conventional meter 64 which indicates fuel flow through carburetor 22. Finally, since analog divider 62 receives signals directly proportional to both the air and fuel flow rates through carburetor 22, it has all the information required to calculate and generate an output on a line 65 equal to the air-fuel mixture ratio. A still further meter 66 may be provided for receiving and displaying this signal.

To compensate for the possibility that the percentage of tracer material contained in fuel mixture 12 flowing in pipe 18 may vary, the output of monitor 24, on line 25, may be applied as an error signal to analog divider 62 to correct, where necessary, the fuel flow indicated on meter 64 and the air-fuel mixture ratio indicated on meter 66.

In operation, carburetor flow stand 10 is capable of determining air flow rate, fuel flow rate and air-fuel ratio, all downstream of carburetor 22, in order to eliminate the limitations of prior art systems resulting from the settling time required to achieve a steady state flow after adjustments are made to a carburetor and the preclusion of measuring fuel distribution from the individual barrels of a multi-barrel carburetor. Additionally, carburetor flow stand 10 solves the problems of accurately and quickly measuring air and fuel flow downstream of carburetor 22, which measurement is made difficult because the output from carburetor 22 is a mixture of liquid and aerosol.

The accuracy of any sampling and measuring technique is dependent on obtaining a truly representative and reproduceable sample. Presently used fuels, such as Stoddard's solvent, are complex mixtures of aliphatic and aromatic hydrocarbons. Since the ratio of aromatics to aliphatics can change as fuel 12 is recycled through a testing system, there is insufficient constancy in the mixture properties to permit analysis to the desired degree of accuracy on a production line basis. Therefore, what is required is an analytical technique dependent on physical mass only.

According to the present invention, in order to provide a high degree of constancy to the test fluid, a tracer material is added to the test fluid. The tracer material is selected to impart a property to fuel 12 which may be readily detected. According to the present invention, if a known quantity of a tracer material is added to the fuel, which tracer material can be volatilized out of the air-fuel mixture to form a homogeneous mixture with the air stream, a truly representative and reproduceable sample of such mixture may be detected and analyzed with conventional equipment. Although it may be possible to detect the presence of such a tracer material using changes in capacitance, sonic velocity, tuning of resonant cavities, continuous weighing and other concepts employing the measurement of physical properties of the mixture, the preferred technique for analyzing the homogeneous mixture is to examine the tracer's absorption characteristic in the electromagnetic spectrum. More specifically, the tracer material added to fuel 12 would be selected so as to have a high absorption characteristic at a predetermined location in the electromagnetic spectrum. Preferably, the predetermined location in the electromagnetic spectrum where the tracer material has a high absorption characteristic coincides with a location where the fuel itself has a relatively low absorption characteristic. The sample passing through analyzer 52 could then be exposed to a radiation source with a broad radiation spectrum in the area of interest. By determining the amount of radiation absorbed by the mixture passing through the sample cell, a direct indication of the quantity of such tracer material in suction pipe 30 may be derived. Furthermore, the quantity of tracer material in suction pipe 30 is directly proportional to the fuel flow rate through carburetor 22 because of the known percentage of tracer material in fuel 12.

It will be appreciated by those skilled in the art that it is possible to add a tracer material having a high absorption characteristic at any location in the electromagnetic spectrum, such as in the x-ray spectrum, the ultraviolet spectrum or the infrared spectrum. According to the present invention, and based upon the present fuels used to test carburetors, it is proposed to select a tracer material having a high absorption characteristic in the infrared spectrum whereby analyzer 52 is an infrared spectrophotometer. A suitable spectrophotometer is shown diagrammatically in FIG. 3.

Figure 3:
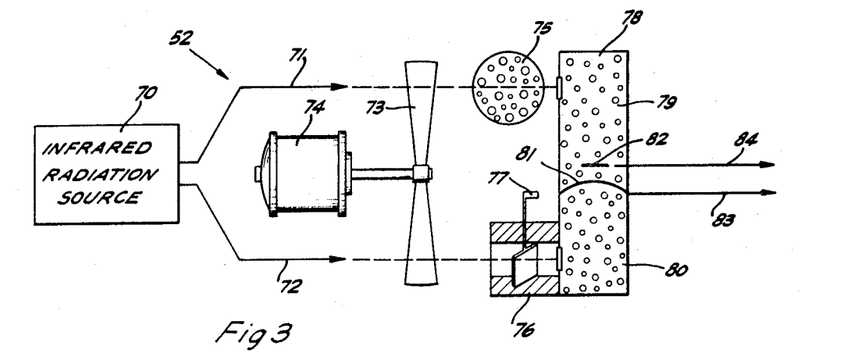
FIG. 3 is a schematic diagram intended to show the operation of an infrared analyzer for use in the flow stand of FIG. 1.

Referring now to FIG. 3, analyzer 52 may include an infrared radiation source 70 which emits two identical beams 71 and 72 of infrared radiation, each having a broad radiation spectrum. Beams 71 and 72 are pulsed by a chopper 73 driven by a motor 74. Beam 71 passes through a sample cell 75 which receives the sample from conduit 51. Beam 72 passes through a reference cell 76 which includes a moveable shutter 77 which may be used to set the zero level of analyzer 52. After passing through sample and reference cells 75 and 76, beams 71 and 72, respectively, enter opposite ends of a detection chamber 78.

Detection chamber 78 is a permanently sealed unit divided into two compartments 79 and 80 by a thin, metal diaphragm 81. Both compartments 79 and 80 are charged to the same pressure with the tracer being measured. When the tracer being measured enters sample cell 75, it absorbs infrared radiation at the same wavelengths as the gas in compartment 79, the amount of absorption being proportional to the quantity of tracer present in cell 75. This reduces the amount of radiation reaching the gas in compartment 79 and produces a lower pressure in compartment 79 than that in compartment 80. As a result, diaphragm 81 bends toward the side of lower pressure, and this movement is detected through use of a plate 82 positioned in detection chamber 78. Diaphragm 81 and plate 82 form the two halves of a capacitive element and are connected to electrical leads 83 and 84, respectively, which provide an output signal proportional to the absorption of radiation in sample cell 75. Since the absorption of radiation in cell 75 is directly proportional to the quantity of tracer in suction pipe 30 which is further directly proportional to the fuel flow rate through carburetor 22, the output signal on leads 83 and 84 is proportional to the fuel flow rate.

Returning now to FIG. 1, a suitable tracer material is a compound selected from some one of the halocarbons, that is, a compound in which some or all of the hydrogen atoms have been replaced by one or more of the halogens, i.e. fluorine, chlorine or bromine. Examples of such compounds are dichloro-difluoro-methane dichloro-tetrafluoro-ethane, dichloro-methane, dibromo-tetrafluoro-ethane and trichloro-trifluoro-ethane. The last mentioned fluoro-carbon, sold under the trademark Freon, a non-flammable, non-toxic, low boiling point, volatile material which has a high infrared absorption characteristic at a location in the infrared spectrum where Stoddard's solvent has a very low absorption characteristic, has been found very satisfactory. With the use of the evaporator shown in FIG. 2, and without the necessity of adding any heat, it has been found that Freon will be completely volatilized into the air stream. Furthermore, by not requiring heat, the Stoddard's solvent may be kept to a low temperature to minimize its vaporization, thereby minimizing both analytical interference and solvent loss.

With reference to FIG. 1, preliminary preparations will be made to fill tank 11 and with a suitable fuel 12, such as Stoddard's solvent, and to disburse within fuel 12 by way of stirrer 13 a predetermined quantity of a tracer material, such as Freon. The quantity of tracer material contained within fuel 12 can be sensed in the recirculation pipe loop 18 by way of sensors 23 and monitor 24 so that it can be determined whether the percentage tracer leaving tank 11 is the same as the percentage tracer returning thereto. Once equilibrium has been established, then a carburetor 22 can be attached to evaporator 40 and the vacuum source activated to draw air through carburetor 22. Once air begins to flow through carburetor 22, fuel is also caused to flow in the customary manner.

Sensor 23 may be a probe, similar to probe 50, for extracting a sample of fuel 12 from recirculation pipe leap 18. Monitor 24 may be an infrared spectrum analyzer, similar to analyzer 52, for providing an electrical output on lead 25 indicative of the percentage of tracer material in fuel 12. Whereas analyzer 52 operates in the vapor phase, monitor 24 would operate in the liquid phase. However, operation would be, in all material respects, identical.

If it is assumed that there is a constant percentage of tracer material in fuel 12, then a condition can be established whereby measurement of the tracer material will be representative of the quantity of fuel flowing. For example, if one percent of the total mixture in tank 11 is tracer, and the quantity of such tracer in suction pipe 30 is determined, it is a simple matter to determine the quantity of fuel passing through carburetor 22. Carburetor flow stand 10 is capable of providing a direct readout of air-fuel ratio on meter 66. Such a readout is based on ratioing the partial pressure of the Freon vapor to the partial pressure of either oxygen in air or simply the total pressure of air as discussed previously. The concentration of the tracer material would preferably be adjusted to some constant value in fuel 12. However, variations may be easily compensated for by use of monitor 24.

The tracer material vapor must be homogeneously mixed with the air stream. At the same time, the fuel liquid and aerosol would have to be separated from the air stream. This is necessary to minimize analytical interference and fouling of the optical surfaces in analyzer 52 as well as to provide analyzer 52 with a uniform, homogenous mixture. Baffle box 41 would be designed to provide a high degree of separation of the fuel liquid and aerosol which would be collected In sump 41a and recovered through valve 42. Sampling probe 50 is then placed in suction pipe 30, downstream of baffle box 41, so as to supply a "clean" sample to a non-disbersive, infrared analyzer.

It should be mentioned that if it would be possible to maintain a sufficient constancy in the mixture properties of fuel 12 itself, it would be possible to eliminate the tracer and simply vaporize all of the fuel itself to form a homogeneous air-fuel mixture. Such vaporized fuel mixture could then be analyzed looking at a predetermined location in the electromagnetic spectrum, such as the infrared spectrum, to derive a quantitative determination as to the fuel flow rate through suction pipe 30. However, this approach would require the use of new fuels in carburetor flow stand 10 which may be considered undesireable because of the many years of experience derived in use of the present solvents. However, it is considered to be within the scope of the present invention to perform such complete vaporization of a fuel and detect and measure an electromagnetic property of the fuel itself.

Several techniques are available for calibrating carburetor flow stand 10. The first calibration technique may be referred to as the comparison method where carburetor 22 is compared with a standard or "OK" sample carburetor. Such an "OK" carburetor may be positioned on evaporator 40 and flow tested as discussed previously. With the "OK" carburetor on evaporator 40 and air and fuel flowing therethrough, the gain settings on flow stand 10 may be adjusted to readout a proper air fuel ratio. More specifically, after the "OK" carburetor is positioned on evaporator 40, a certain inlet pressure of air is selected by selective operation of valves 33. Then, with a certain throttle opening in the "OK" carburetor and with a known air flow rate as indicated on meter 63, the "OK" carburetor will produce a known fuel flow rate and a known air-fuel ratio. At this point, meters 64 and 66 are uncalibrated. Therefore, all that is required is that shutter 77 in reference cell 76 be adjusted to align the zero reference point on meters 64 and 66 and the gain in divider 62 be adjusted so that meters 64 and 66 read out the known fuel flow rate and air-fuel ratio, respectively. After measurement is made at one location, such as curb idle, other valves 33 and sonic nozzles 32 may be actuated to calibrate meters 64 and 66 at off idle, part throttle and/or wide open throttle.

Another possible calibration technique is to use a calibration flange. A calibration flange is merely a flat piece of metal with a hole drilled therethrough, which hole represents the restriction of a carburetor under certain conditions. Typically, different calibration flanges with different size holes are provided to represent different air flow rates through a carburetor. Such calibration flanges automatically provide a vacuum setting under the carburetor that would correspond to the correct throttle opening. With such a calibration flange controlling air flow, fuel can be injected at an accurately known flow rate to permit a basic system calibration, and thus determining system accuracy.

The difficulty with such an approach is the ability to accurately control flow. For example, at curb idle, the flow to carburetor 22 may be as low as 30 cc/min. If it is desired to control flow within 0.1 percent, this amounts to an allowable variation of only 0.03 cc/min., less than one drop of liquid per minute. One technique for achieveing this degree of control is to use a ground glass syringe whose plunger is actuated by a lead screw driven by an electric motor. The motor speed may then be held constant by controlling electronics. Other approaches will be obvious to those skilled in the art. In any event, with known air flow and fuel flow rates through the system, meters 64 and 66 may be readily calibrated.

Once meters 64 and 66 are calibrated using an "OK" carburetor or a calibration flange, which calibration would normally be performed at the start of each test run, a production carburetor can then be placed on evaporator 40 and flow tested as described previously whereupon meters 64 and 66 will indicate fuel flow rate and air-fuel ratio for a number of different settings of the throttle valve.

The advantages of carburetor flow stand 10 should now be apparent. In the first instance, carburetor flow stand 10 completely eliminates the limitations inherent in systems which make upstream fuel flow measurements. The first limitation that is completely eliminated is that which results from the settling time required to achieve a steady state flow after adjustments are made to a carburetor. In flow stand 10, variations in upstream flow rate caused by oscillations of the float mechanism in carburetor fuel bowl 21 are completely irrelevant since they do not affect the constant, steady state flow of fuel to carburetor 22. Accordingly, as soon as carburetor fuel bowl 21 is full and fuel begins to flow into carburetor 22, only a relatively short period of time is required before an output is indicated on meters 64 and 66.

Another important advantage of carburetor flow stand 10 is that it eliminates the second limitation of upstream fuel flow measurement systems, namely the preclusion of measuring fuel distribution from the individual barrels of multi-barrel carburetors. More specifically, many automobile engines have two or four barrel carburetors. In the event of a two barrel carburetor, the carburetor is literally divided in half, one barrel of the carburetor feeding half of the cylinders of the engine and the other barrel feeding the remainder of the cylinders of the engine. With upstream fuel flow systems, it is only possible to analyze the total fuel flow handled by the carburetor. On the other hand, with the present system, all equipment downstream of carburetor 22 may be duplicated so that the air-fuel-tracer exiting from the individual barrels may be separately processed, analyzed and measured. In this manner, individual adjustment of the separate barrels of the carburetor may be readily achieved.

The same system would also be used to check the different barrels of a four-barrel carburetor. More specifically, a four-barrel carburetor is essentially a two-barrel carburetor in which each half of the carburetor contains two barrels which operate sequentially and feed the same manifold. Therefore, since the output of the two barrels on one side of the carburetor are combined before being applied to the engine, they may be analyzed and adjusted together. Alternatively, as a research tool, it will be apparent that each barrel of four-barrel carburetors could conceivably be checked separately.

The present invention provides still further advantages and opportunities not available with prior art systems. Since the present system is not limited to making fuel measurements at the point of entry into the carburetor fuel bowl, but places a probe downstream of the carburetor to sample a portion of the air-fuel mixture, the present technique is ideally suited as a research tool to analyze air and fuel flow and manifolding. More specifically, it would be a simple matter, using the present techniques, to analyze the flow distribution, not in a flow stand, but when carburetor 22 is placed on an actual engine. All engines include manifolds to conduct the output of carburetor 22 to the individual cylinders of the engine. The present apparatus may be utilized to analyze the flow through such manifolds by locating a plurality of sensors at different locations in such manifolds.

Carburetor flow stand 10 also overcomes the problems inherent in the invention disclosed and claimed in the beforementioned copending patent application in the name of Edward H. Casey. More specifically, by volatilizing the tracer material to form a homogeneous mixture of air and tracer material and separating such mixture from the fuel itself, the difficulties of not having a uniform, homogeneous mixture are eliminated. In addition, with the present technique, it is not necessary to vaporize all of the fuel to sense a physical property thereof although it may be possible to vaporize all of the fuel to sense an electromagnetic property thereof.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a carburetor flow stand for determining the fuel flow rate through or the air-fuel mixture ratio produced by a carburetor under test in which means are provided for establishing a predetermined air flow through said carburetor and for generating a signal indicative of said air flow, in which a fuel flow line is provided for conducting a liquid fuel to said carburetor, said carburetor operating to mix said fuel with said air, and in which an output line is provided for receiving the air-fuel mixture from said carburetor, the improvement wherein:
   a predetermined percentage of a tracer material having a high absorption characteristic at a predetermined location in the electromagnetic spectrum is added to said fuel and comprising:
   detection means operatively associated with said output line and sensitive to said predetermined location in the electromagnetic spectrum for detecting and measuring the quantity of said tracer in said output line, said detected quantity of tracer being proportional to the fuel flow rate through said carburetor.

2. In a carburetor flow stand according to claim 1, the improvement wherein said predetermined location in the electromagnetic spectrum where said tracer material has a high absorption characteristic is selected to coincide with a location where said fuel has a relatively low absorption characteristic.

3. In a carburetor flow stand according to claim 1, the improvement wherein said detection means is operative to generate a signal indicative of the quantity of said tracer material in said output line and further comprising:
   means responsive to said signal indicative of air flow and said signal indicative of the quantity of said tracer material in said output line fOr generating an air-fuel mixture ratio signal.

4. In a carburetor flow stand according to claim 3, the improvement further comprising:
   means interposed in said fuel flow line for monitoring the percentage of tracer material in said fuel and for generating a signal indicative thereof and wherein said means for generating an air-fuel mixture ratio signal is responsive to said signal indicative of the percentage of tracer material in said fuel for correcting said ratio signal as a function of variations of said percentage of tracer material.

5. In a carburetor flow stand according to claim 1, the improvement wherein said tracer material has a high absorption characteristic in the infrared spectrum and wherein aid detection means is an infrared analyzer.

6. In a carburetor flow stand according to claim 5, the improvement wherein said predetermined location in the infrared spectrum where said tracer material has a high absorption characteristic is selected to coincide with a location where said fuel has a relatively low absorption characteristic.

7. In a carburetor flow stand according to claim 1, the improvement further comprising:
means interposed in the path of said air flow through said carburetor for effecting vaporization of said tracer material.

8. In a carburetor flow stand according to claim 7, the improvement further comprising:
means interposed in said output line, between said carburetor and said detection means, for separating said liquid fuel from said air flow and said vaporized tracer material.

9. In a carburetor flow stand according to claim 8, the improvement wherein said detection means operates to generate a signal indicative of the quantity of said tracer material in said output line and further comprising:
means responsive to said signal indicative of air flow and said signal indicative of the quantity of said tracer material in said output for generating an air-fuel mixture ratio signal.

10. In a carburetor flow stand according to claim 9, the improvement further comprising:
means interposed in said fuel flow line for monitoring the percentage of tracer material in said fuel and for generating a signal indicative thereof and wherein said means for generating an air-fuel mixture ratio signal is responsive to said signal indicative of the percentage of said tracer material in said fuel for correcting said ratio signal as a function of variations of said percentage of tracer material.

11. In a carburetor flow stand according to claim 8, the improvement wherein said tracer material has a high absorption characteristic in the infrared spectrum and wherein said detection means is an infrared analyzer.

12. In a carburetor flow stand according to claim 11, the improvement wherein said predetermined location in the infrared spectrum where said tracer material has a high absorption characteristic is selected to coincide with a location where said fuel has a relatively low absorption characteristic whereby portions of said fuel which are not removed by said separating means have a minimum effect on said infrared analyzer.

13. A carburetor flow stand for testing the fuel metering performance of a carburetor comprising:
means for establishing an air flow through said carburetor,
means for conducting a liquid fuel to said carburetor, said carburetor operating, in the presence of said air flow, to mix said fuel with said air;
means forming a passageway connected to the downstream end of said carburetor for receiving the output therefrom, said output consisting of an essentially homogeneous mixture of air and at least one vaporized component of said fuel; and
detection means responsive to said output and sensitive to an electro-magnetic property of said at least one vaporized component in said homogeneous mixture for detecting and measuring the quantity of said at least one component in said mixture.

14. A carburetor flow stand according to claim 13 further comprising:
means interposed in said passageway, adjacent said downstream end of said carburetor, for vaporizing said at least one component of said fuel to produce said homogeneous mixture.

15. A carburetor flow stand according to claim 14 wherein said vaporizing means vaporizes essentially all of said fuel and wherein said detection means determines the quantity of said fuel in said mixture.

16. A carburetor flow stand according to claim 14 wherein a predetermined percentage of a tracer material is added to said fuel, wherein said vaporizing means is operative to vaporize said tracer material, and wherein said detection means is operative to determine the quantity of said tracer material in said mixture.

17. A carburetor flow stand according to claim 16 wherein said tracer material has a high infrared absorption characteristic at a known location in the infrared spectrum and wherein said detection means senses the absorption characteristics of said mixture at said known location.

18. A carburetor flow stand according to claim 17 wherein said tracer material has a high infrared absorption characteristic at a location in the infrared spectrum where said fuel has a relatively low infrared absorption characteristic.

19. A carburetor flow stand according to claim 17 further comprising:
means interposed in said passageway, between said vaporizing means and said detection means, for separating said liquid fuel from said air flow and said vaporized tracer material.

20. A carburetor flow stand according to claim 13 wherein said detection means is operative to generate a first signal indicative of the quantity of said at least one component in said homogeneous mixture, said quantity of said at least one component being proportional to the fuel flow rate through said carburetor, and further comprising:
sensor means for generating a second signal indicative of the rate of air flow through said carburetor; and
means responsive to said first and second signals for generating an air-fuel ratio signal.

21. A carburetor flow stand according to claim 20 wherein said sensor means comprises an absolute pressure transducer interposed in said passageway for generating a signal proportional to air flow, wherein said detection means generates a signal indicative of the pressure of said at least one component in said homogeneous mixture, and wherein said means for generating an air-fuel ratio signal comprises:
a divider for dividing said signal proportional to air flow by said signal indicative of the pressure of said at least one component.

22. A carburetor flow stand according to claim 20 wherein said sensor means comprises an oxygen sensor interposed in said passageway for generating a signal proportional to the partial pressure of oxygen in said homogenous mixture, wherein said detection means generates a signal indicative of the partial pressure of said at least one component in said homogeneous mixture, and wherein said means for generating an air-fuel ratio signal comprises:
a divider for dividing said signal proportional to the partial pressure of oxygen by said signal indicative of the partial pressure of said at least one component.

23. In a carburetor testing method for determining the fuel flow rate through a carburetor including the steps of establishing a predetermined air flow through said carburetor, conducting a liquid fuel to said carburetor, and receiving the output from the downstream end of said carburetor, said output consisting of an essentially homogenous mixture of air and at least one vaporized component of said fuel, the improvement comprising the step of:

measuring an electromagnetic property of said homogeneous mixture, said property being representative of the quantity of said at least one component in said mixture, said measured quantity of said at least one component being proportional to the fuel flow rate through said carburetor.

24. In a carburetor testing method according to claim 23, the improvement further comprising the step of:

adding a predetermined percentage of a tracer material to said fuel, said tracer material having a high absorption characteristic at a known location in the electromagnetic spectrum, said at least one component of said fuel consisting of said tracer material, and wherein said step of measuring comprises the step of:

detecting the quantity of said tracer material in said mixture.

25. In a carburetor testing method according to claim 24 for determining the air-fuel mixture ratio produced by said carburetor, the improvement further comprising the steps of:

generating a first signal indicative of the quantity of said tracer material in said homogeneous mixture;
generating a second signal indicative of the rate of air flow through said carburetor; and
dividing said second signal by said first signal to generate a third signal indicative of the air-fuel mixture ratio produced by said carburetor.

26. In a carburetor testing method according to claim 25, the improvement further comprising the steps of:

monitoring the percentage of said tracer material in said fuel and generating a signal indicative thereof; and
modifying said third signal as a function of variations of said percentage of tracer material.

27. In a carburetor testing method according to claim 24, the improvement wherein said known location where said tracer material has a high absorption characteristic is selected to coincide with a location where said fuel has a relatively low absorption characteristic.

28. In a carburetor testing method according to claim 23 for determining the air-fuel mixture ratio produced by said carburetor, the improvement further comprising the steps of:

generating a first signal indicative of the quantity of said at least one component in said homogeneous mixture;
generating a second signal indicative of the rate of air flow through said carburetor; and
dividing said second signal by said first signal to generate a third signal indicative of the air-fuel mixture ratio produced by said carburetor.

29. In a carburetor testing method according to claim 23, the improvement wherein said electromagnetic property of said mixture is the infrared absorption characteristic of said mixture.

30. In a carburetor testing method according to claim 29, the improvement further comprising the step of:

adding a predetermined percentage of a tracer material to said fuel, said tracer material having a high infrared absorption characteristic at a known location, said at least one component of said fuel consisting of said tracer material, and wherein said step of measuring comprises the step of:

detecting the quantity of said tracer material in said mixture.

31. In a carburetor testing method according to claim 30, the improvement further comprising the steps of:

generating a first signal indicative of the quantity of said tracer material in said homogeneous mixture;
generating a second signal indicative of the rate of air flow through said carburetor; and
dividing said second signal by said first signal to generate a third signal indicative of the air-fuel mixture ratio produced by said carburetor.

32. In a carburetor testing method according to claim 31, the improvement further comprising the steps of:

monitoring the percentage of said tracer material in said fuel and generating a signal indicative thereof; and
modifying said third signal as a function of variations of said percentage of tracer material.

33. In a carburetor testing method according to claim 30, the improvement wherein said known location where said tracer material has a high infrared absorption characteristic is selected to coincide with a location where said fuel has a relatively low absorption characteristic.

* * * * *